Nov. 25, 1969  W. H. KROENING  3,480,301
SELF-CENTERING GAUGE RING
Filed June 27, 1968
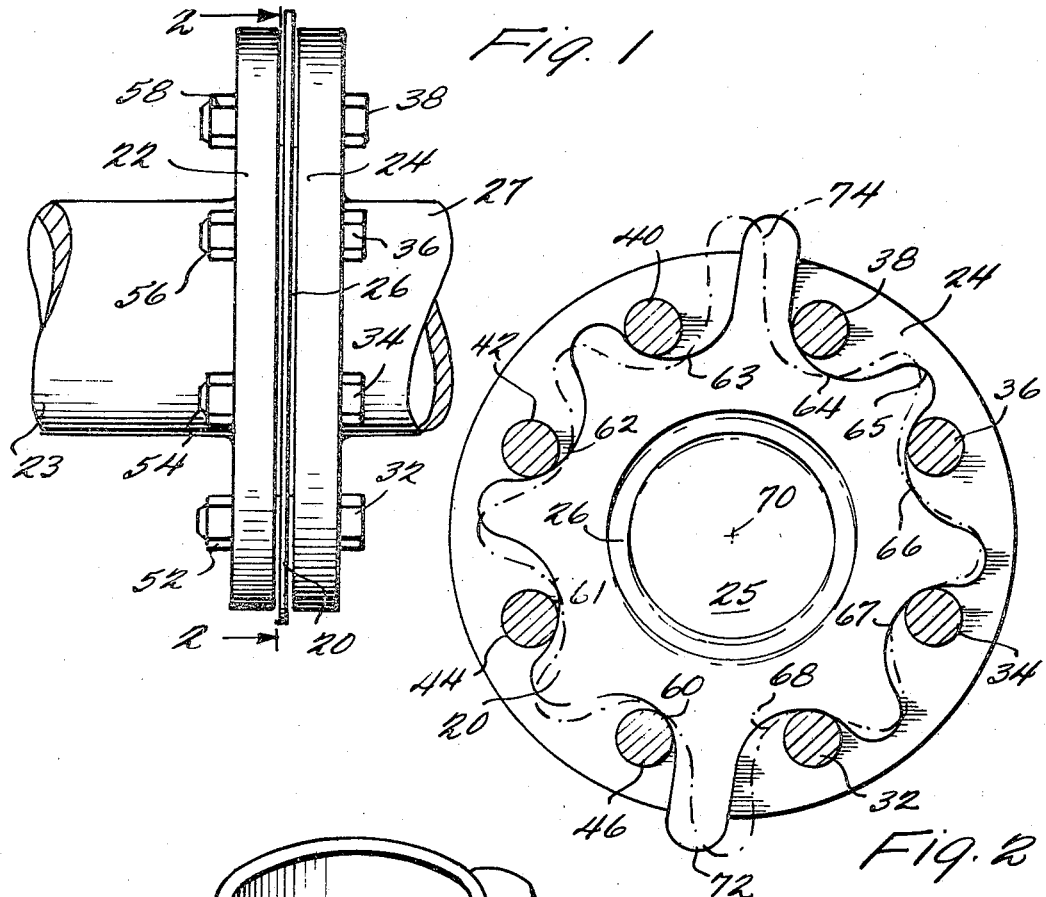
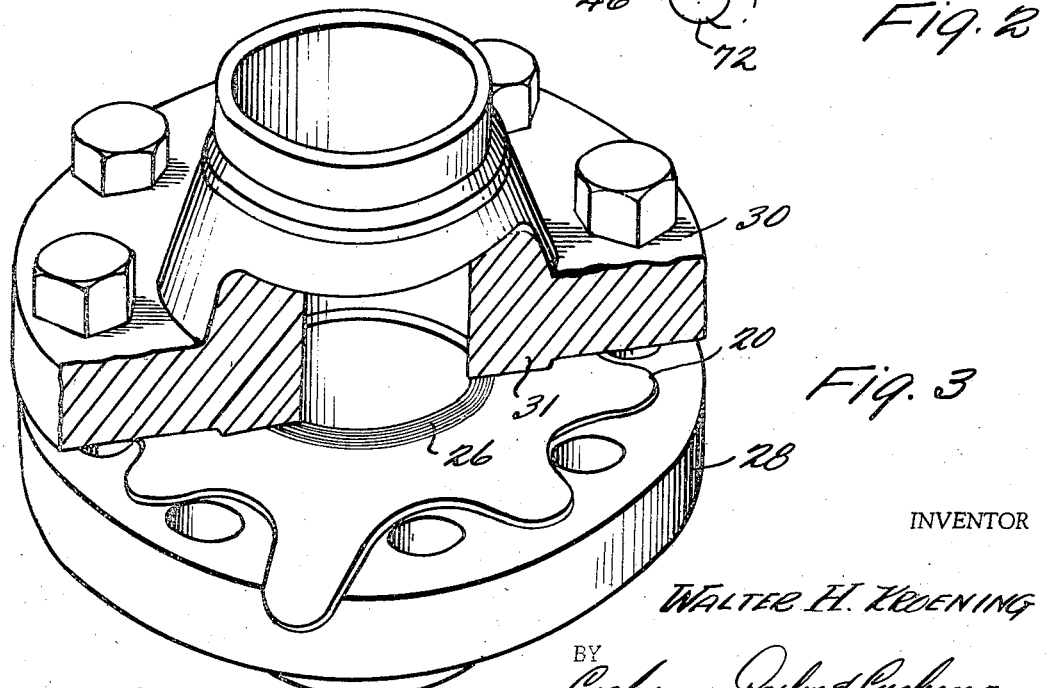
INVENTOR
WALTER H. KROENING
BY
Cushman, Darby & Cushman
ATTORNEYS United States Patent Office 3,480,301
Patented Nov. 25, 1969

3,480,301
SELF-CENTERING GAUGE RING
Walter H. Kroening, 24 Star Lake Drive,
Warrington, Fla. 32507
Filed June 27, 1968, Ser. No. 740,537
Int. Cl. F16l 55/00, 21/02; F16j 9/04
U.S. Cl. 285—119                                    13 Claims

ABSTRACT OF THE DISCLOSURE

Apparatus for installing a gasket to form a seal between two assemblies fastened together with bolts whereby the gasket is mounted within a conpression gauge ring having a peripheral portion extending outwardly for manually rotating the ring and an outer camming surface engageable with the bolts in response to the rotation to center the gasket. To install and position the gasket, the gauge ring is set loosely inside the area bounded by the bolts which have been inserted into one assembly. The two assemblies are then bolted loosely together so that the ring can be rotated to cause the camming surface to engage the bolts and thereby precisely center the gasket which is then held immobile after the assemblies are tightly bolted together.

DESCRIPTION OF PRIOR ART AND SUMMARY OF THE INVENTION

The invention relates to a self-centering gauge ring which serves to precisely center a gasket which maintains a seal between two assemblies secured together with bolts.

In the past, attempts have been made to center a gasket, which maintains a seal between two assemblies bolted or otherwise fastened together, by lodging the gasket within a mounting which is then held immobile and centered between the assemblies by, for example, contact with all or some of the bolts. One such mounting is simply a circular ring with the gasket mounted within a central cavity, and having an outside diameter which is considerably less than the distance between opposing bolts, so that when installed, the ring then fits against some of the bolts and is partially centered. Because this circular ring may be only partially centered the inside diameter of the gasket is purposely made larger than the normal pipe I.D. In assembled position this difference in size leaves a void on one side of the opening which is objectionable. The invention presented here allows the I.D. of the gasket to be made the same as the nominal pipe I.D. because of the positive centering accomplished by the camming action of the apparatus.

Many variations of this type of mounting have been made including a ring with holes through which all or some of the bolts pass to hold the ring firmly in one place and rings with straps which pass around some of the bolts. However, all such mountings have been awkward to install.

In contrast, this application discloses a self-centering compression gauge ring which can be simply and easily installed and yet which also serves to precisely center the gasket. This goal is accomplished by using a gauge ring which can be set in the region bounded by the bolts and then rotated so that camming surfaces on the periphery of the ring engage bolts and thereby position the gasket mounted within the ring.

In the specific embodiment described below, the gauge ring is flat and polygon shaped with outer camming surfaces which are engageable with the bolts and which curve about those bolts so that the ring can be loosely positioned between the two assemblies while the bolts are inserted and then manually rotated by means of a protruding tab until each of the camming surfaces contacts a bolt and the gasket mounted therein is precisely centered.

Since in this embodiment, the ring fits loosely between the bolts in a first position and can be rotated to a second immobile position with all of the bolts contacting a camming surface, small errors in the dimensions of the rings, bolts and assemblies do not necessarily prevent the gasket from being properly centered and held immobilized.

Furthermore, in the embodiment discussed below, each of the camming surfaces is identical and separated by a uniform angular distance. This basic configuration of the embodiment may be applied to the full range of standard size flanges using proportionate increases or decreases as related to the proper bolt hole circle as specified for a given flange.

Other objects and purposes of the invention will become clear after reading the following detailed description of the drawings.

BRIEF DESCRIPTION OF THE DRAWINGS

FIGURE 1 shows a view of the self-centering gauge ring held in place between two pipe flanges;

FIGURE 2 shows a view of FIGURE 1 taken along the line 2—2; and

FIGURE 3 shows a view of the self-centering gauge ring mounted between two other pipe flanges with a portion of one flange removed to show the ring and gasket in place.

DETAILED DESCRIPTION OF THE DRAWINGS

Reference is now made to FIGURES 1 and 2 which show a gauge ring 20 mounted between two pipe flanges 22 and 24, each of which has a circular central passageway 25 through which fluid passes and each of which is the termination of a pipe member, flange 22 terminating pipe 23 and flange 24 pipe 27. Any type of fluid may, of course, be carried by such pipes at all temperatures and pressures and this invention finds utility whenever a gasket is required to be centered between two assemblies which are bolted together.

In FIGURE 3, gauge ring 20 is shown between two similar flanges 28 and 30. A portion of flange 30 has been removed along with four of the eight bolts used to fasten the flanges 28 and 30 together so that the position of the gauge ring 20 and gasket 26 in the centered and immobile position can be clearly seen. Each of the flanges 28 and 30 has a raised face, for example raised face 31 on flange 30, which rings the central passageway 25 and assists in holding the ring 20 firmly in place. The flanges 22 and 24 in FIGURES 1 and 2 in contrast have flat opposed faces but gauge ring 20 can be used with equal facility with both types of faces as well as with other types such as lap joint, and Van Stone.

A spiral wound gasket 26 is mounted within the gauge ring 20 in any suitable fashion so as to be held firmly in place and serves to maintain a tight seal between the two flanges 22 and 24, as well as the flanges 28 and 30, to prevent escape of whatever fluid is confined within the passageway 25. The two flanges 22 and 24 are fastened together by eight bolts 32, 34, 36, 38, 40, 42, 44 and 46, upon which are threaded eight nuts, of which only four, 52, 54, 56 and 58, are visible in FIGURE 1. However, the other four bolts, 40, 42, 44 and 46, have nuts threaded on them in the same manner. Although the gauge ring 20 can be used with any type of gasket, such as a simple gasket made of rubber or similar material, a spiral wound gasket has a number of distinct advantages and for this embodiment is preferred.

A spiral wound gasket, such as gasket 26, can be constructed of alternating plys of preformed spring-like metal and non-metallic fillers. Such a structure is flexible and provides sufficient resiliency to allow self-adjustment by the gasket in response to changes in operating conditions so that a tight seal is constantly maintained. Although, in designing a given gasket for any particular application, the nature, temperature, and pressure of the confined fluid and anticipated thermal shocks, vibrations, abrasions, and erosions, as well as many other factors must be considered if the gasket is to function optimumly. A spiral wound gasket is capable of adapting to radially changed conditions. Furthermore, spiral wound gaskets are capable of operating under the most rigorous conditions in any practical temperature pressure system from vacuum to pressures well above 5,000 lbs. per square inch and temperatures from near absolute zero to 2,000° F. and higher.

In constructing a spiral wound gasket a number of different materials may be used, depending upon the particular operating conditions for which the gasket is specifically designed. The metal filter is often stainless steel, but carbon steel, copper, nickel, Phosphor bronze, titanium alloys, and other materials are also employed to some extent. The non-metallic filler material is most often asbestos, but other materials such as Teflon, inorganic ceramic, fiber sheets with special binders and Teflon impregnated asbestos have also found utility in special circumstances.

The gasket 26 is not, of course, necessarily round but can be of any shape necessary to maintain a seal. For example, square, triangular and elliptical gaskets have been used to seal specific types of assemblies. Nor is it necessary that the seal be between the flanges of two pipes. The present invention can also be used to maintain a seal between any two assemblies such as boiler manholes, manhole covers, etc.

The gasket 26 is, when not under compression, of course somewhat thicker than gauge ring 20 and remains slightly thicker even under full compression. A spiral wound gasket having a thickness of about .175 inch ordinarily compresses to about a thickness of .125 to .135 inch and for this design, a gauge ring thickness of about .125 inch which prevents the gasket from being compressed beyond .125 inch has been found appropriate.

The gauge ring 20 also serves a number of additional purposes besides facilitating accurate centering of the gasket 26 and easing problems of installation as described below. The gauge ring 20 holds the gasket 26 firmly in position and provides additional radial strength for the gasket 26, substantially reducing the chances of a blow-out or any lateral movement of the gasket 26 under pressure of the fluid in the passageway 25. Also, the ring 20 serves as a compression stop to limit the thickness to which the gasket 26 can be compressed. Furthermore, since the use of the gauge ring 20 allows the gasket 26 to be very precisely centered, the inside diameter of the gasket 26 itself can be made approximately equal to the inside diameter of the passageway 25. This results in a substantial increase in gasket efficiency over gaskets which cannot be centered so precisely and hence must be made somewhat larger than the pipe. Also considerable savings in gasket material with a corresponding decrease in gasket cost are realized.

The installation of the gasket 26 is accomplished by inserting a bolt through some or all of the bolt holes in either of the flanges, for example flange 24, and then setting the polygon shaped gauge ring 20 loosely in place inside the area bounded by the inserted bolts so that one of the camming surfaces curves around each bolt. Since the gauge ring 20 is designed for use with eight bolts, eight such surfaces 60–67 inclusive, circle bolts 46, 44, 42, 40, 38, 36, 39 and 32, respectively.

Since the distance from the center 70 of the gauge ring to the nearest point of each of the surfaces 60–67 is less than the distance to the nearest point of each of the bolts, the gauge ring can be placed loosely in the manner that is shown by dashed lines in FIGURE 2 without touching all of the bolts. Of course, the gasket 26 is not centered precisely since it is free to move a certain distance laterally.

The other flange, for example flange 26, is then disposed so that the inserted bolts mate with the holes of flange 26, thereby trapping the ring gauge 20 with the gasket 26 between flanges 24 and 26. The remainder of the bolts can then be inserted and the nuts threaded on the appropriate bolts until about fingertight. The gauge ring 20, which is still able to move, can then be rotated in either direction by moving one of the protruding tabs 72 or 74 until each of the camming surfaces 60–67 contacts one of the bolts so that the ring 20 is held firmly in one location and cannot move except by rotating the ring in the opposite direction. Of course, the ring 20 could also be designed to engage a lesser number of bolts, such as four (minimum), to cam the ring into the proper position by rotation. In this position which will, of course, always be the same, the gasket 26 is exactly centered and the nuts can be tightened as desired while holding the tabs 72 or 74 to prevent further rotation. After the nuts are tightened, the ring will be prevented from rotating back to the initial loose position by the compressing force exerted by the two assemblies 24 and 26.

The camming surfaces 60–67 do not, of course, necessarily have to be constructed in the same manner as shown in FIGURES 1–3; the ring merely has to have a camming surface which engages the bolts to center the ring in response to rotation. Many different arrangements other than the one shown in FIGURES 1–3 are possible.

However, the particular arrangement shown has several distinct advantages. Since the ring 20 has camming surfaces 60–67 which are identical and separated by a uniform angular distance, the gasket 26 will be centered regardless of the angular rotation required, provided that each of the surfaces 60–67 does contact a bolt. Therefore, the gauge 20 can be employed with different flanges having slightly different sized bolts or slightly different distance between opposite bolts while still simply, easily and accurately centering the gasket 26 provided that the number of bolts and the angular separation between the bolts remains the same.

The above embodiment is merely one example of the invention and many changes and modifications are possible without departing from the spirit of the invention.

What is claimed is:

1. A gasket assembly for maintaining a seal between two elements enclosing a passageway and having opposed faces held together by circumferentially disposed bolts comprising:
   a spiral wound gasket with an inner aperture, and
   a compression gauge ring adapted for placement between said faces in the region bounded by said bolts having said gasket mounted within an inner opening and having a peripheral portion with means extending outwardly of said portion for manually effecting a rotational movement of said ring, said ring having cam surface means engageable with said bolts to position said gasket in relation to said passageway in response to said rotational movement.

2. An assembly as in claim 1 wherein said cam surface means is a plurality or regions, each curved about one of said bolts.

3. An assembly as in claim 2 wherein said ring has a first position in which each of said regions does not contact said bolts and a second position in which each of said regions contacts said bolts, said ring being movable from said first to said second position by said rotational movement.

4. An assembly as in claim 1 wherein said rotational movement may be in either direction.

5. An assembly as in claim 1 wherein said gasket is comprised of alternating plies of metallic and non-metallic strips.

6. An assembly as in claim 1 wherein the size of said inner aperture is approximately equal to the size of said passageway.

7. An assembly as in claim 1 wherein said extending means includes at least two tabs.

8. A coupling assembly defining an enclosed sealed passageway comprising:
    two elements, each having an opposed face and an enclosed channel terminating in said face,
    a plurality of circumferentially disposed bolts for fastening said opposed faces together,
    a spiral wound gasket with an inner aperture, and
    a compression gauge ring disposed between said faces in a region bounded by said bolts having said gasket mounted within an inner opening and having a peripheral portion with means extending outwardly of said portion for manually effecting a rotational movement of said ring, said ring having cam surface means engageable with said bolts to position said gasket in response to said rotational movement so that said enclosed channels and said inner aperture are aligned to form said sealed passageway.

9. An assembly as in claim 8 wherein said elements are pipe flanges.

10. An assembly as in claim 8 wherein the size of said inner aperture is approximately equal to the size of said enclosed channels.

11. An assembly as in claim 8 wherein said extending means includes at least two opposed tabs.

12. A method of joining a seal between two elements enclosing a passageway and having opposed faces held together with circumferentially disposed bolts comprising the steps of:
    disposing between said faces and in the region bounded by said bolts, ring means having gasket means disposed within an inner aperture, a peripheral portion with means extending outwardly of said portion for manually effecting a rotational movement of said ring, said ring means having cam surface means engageable with said bolts,
    manually rotating said ring means by said means on said peripheral portion whereby the cam surface means engage the bolts to position said gasket in relation to said passageway and in response to said rotational movement, and tightening said bolts after said rotating to hold said gasket in position in relation to said passageway.

13. A gasket assembly for maintaining a seal between two elements enclosing a passageway and having opposed faces held together by circumferentially disposed bolts comprising:
    gasket means having an inner aperture, and
    positioning means, for placement between said faces in the region bounded by said bolts, having said gasket means mounted within an inner opening and having a peripheral portion with means extending outwardly of said portion for manually effecting a rotational movement of said positioning means said positioning means having a plurality of curved cam surfaces each having a length substantially greater than the diameter of any of said bolts and engageable with at least two of said bolts to position said gasket means in relation to said passageway in response to said rotational movement.

References Cited

UNITED STATES PATENTS

| | | | |
|---|---|---|---|
| 1,138,413 | 5/1915 | Raimondi | 285—363 |
| 1,942,704 | 1/1934 | Hubbard et al. | 277—11 |
| 2,196,953 | 4/1940 | Bohmer et al. | 277—180 |
| 2,462,762 | 2/1949 | Nardin | 277—11 |
| 2,474,790 | 6/1949 | Rossman | 277—11 |
| 2,859,052 | 11/1958 | Corbeels et al. | 277—363 X |

FOREIGN PATENTS 1,046,965  12/1958  Germany.

THOMAS F. CALLAGHAN, Primary Examiner

U.S. Cl. X.R.

29—271, 468; 277—1, 11, 180, 203; 285—363